(12) United States Patent
Ballantyne

(10) Patent No.: US 6,906,996 B2
(45) Date of Patent: Jun. 14, 2005

(54) MULTIPLE MODULATION WIRELESS TRANSMITTER

(75) Inventor: Gary John Ballantyne, Christchurch (NZ)

(73) Assignee: Qualcomm Inc, San Diego, CA (US)

( * ) Notice: Subject to any disclaimer, the term of this patent is extended or adjusted under 35 U.S.C. 154(b) by 380 days.

(21) Appl. No.: 10/152,200

(22) Filed: May 20, 2002

(65) Prior Publication Data
US 2003/0216126 A1 Nov. 20, 2003

(51) Int. Cl.[7] .............................. H04B 1/02; H04B 7/00; H04B 1/66
(52) U.S. Cl. ..................... 370/204; 455/91; 455/102; 455/127.4; 455/522; 375/135; 375/146; 375/298
(58) Field of Search ..................... 455/91, 102, 127.4, 455/522, 552.1; 375/135, 146, 261, 295, 298; 370/204

(56) References Cited

U.S. PATENT DOCUMENTS 6,393,064 B1 * 5/2002 Nagai et al. ................ 375/259
6,445,249 B1 * 9/2002 Khan et al. ................. 330/149
6,704,549 B1 * 3/2004 Sorrells et al. ............. 455/102
2003/0053549 A1 * 3/2003 Uesugi ....................... 375/261

FOREIGN PATENT DOCUMENTS

| EP | 0 891 060 A2 | 1/1999 |
| EP | 1 274 208 A1 | 1/2003 |
| EP | 1 284 565 A1 | 2/2003 |
| WO | 00/76109 A1 | 12/2000 |

* cited by examiner

*Primary Examiner*—Simon Nguyen
(74) *Attorney, Agent, or Firm*—Philip R Wadsworth; Thien Nguyen; Rupit Patel (57) ABSTRACT

A dual modulation transmitter apparatus (100) includes first (134), second (136), and third (132) signal paths. The first signal path includes a polar modulator (120) coupled to a data input (115). The second signal path includes a quadrature modulator (122) coupled to the data input. The third signal path is coupled to an antenna (142) and includes a switch (128) configured to couple the third signal path to the first signal path under a first condition and to couple the third signal path to the second signal path under a second condition. Thus, the transmitter apparatus enjoys the best of both worlds, since it utilizes quadrature or polar modulation in the most appropriate circumstances.

21 Claims, 4 Drawing Sheets

MULTIPLE MODULATION WIRELESS TRANSMITTER

BACKGROUND

1. Field

The present invention generally relates to signal transmitters, and more particularly to a transmitter that employs multiple carrier modulation schemes (such as polar modulation and quadrature modulation) under different operational, environmental, or other conditions.

2. Background

The output power of code division multiple access (CDMA) wireless mobile transceivers must be tightly controlled over a significant dynamic range. Optimally, transmit power should rise and fall in harmony with the power of received signals. Namely when received signals are weaker, this might be because they originate from stations that are far away or because they are degraded by signal interference. In either case, this indicates a need to use greater levels of transmit power. Factors such as shadowing, fading, and simple transmission loss demand a wide dynamic range for a mobile station under power control.

There are many ways to modulate a transmitter's information onto a carrier. Quadrature modulation is a popular method. However, quadrature modulation tends to be noisy at high levels of output power, requiring substantial filtering to limit signal corruption. Nevertheless, with its economical power consumption, quadrature modulation is well suited to low output power regimes. Polar modulation is an alternative to quadrature modulation in which the amplitude and phase of the carrier are modulated directly. Polar modulation is better suited to high power levels than quadrature modulation, but performs poorly at low power.

Quadrature and polar modulation, then, have proven benefits under different circumstances. Conventional wireless mobile transceivers are designed to utilize the one modulation scheme that presents the most benefits and least drawbacks under the intended operating conditions. In fact, this conventional type of transceiver enjoys significant utility and widespread commercial use today.

Nonetheless, engineers at QUALCOMM INC. are continually seeking to improve the performance and efficiency of such mobile stations. In particular, QUALCOMM engineers have recognized that both polar and quadrature modulation schemes have different disadvantages, so that neither quadrature nor polar modulation is optimal for all dynamic conditions. As discussed above, though, wireless mobile transceivers are necessarily used over a significant range of transmit power levels, and these transmit power levels can change many times during a single call. Therefore, known wireless mobile transceivers are not completely adequate in this respect.

SUMMARY

Broadly, one aspect of the present invention is a dual modulation wireless mobile transmitter. The transmitter includes first, second, and third signal paths. The first signal path includes a polar carrier modulator coupled to a data input. The second signal path includes a quadrature carrier modulator coupled to the data input. The third signal path is coupled to an antenna and includes a switch configured to couple the third signal path to the first signal path under a first condition and to couple the third signal path to the second signal path otherwise. Thus, the transmitter enjoys the best of both worlds, utilizing quadrature or polar modulation depending upon environmental, operational, or other circumstances.

DETAILED DESCRIPTION

The nature, objectives, and advantages of the invention will become more apparent to those skilled in the art after considering the following detailed description in connection with the accompanying drawings.

Structure: Hardware Components and Interconnection

Introduction

Figure 1:
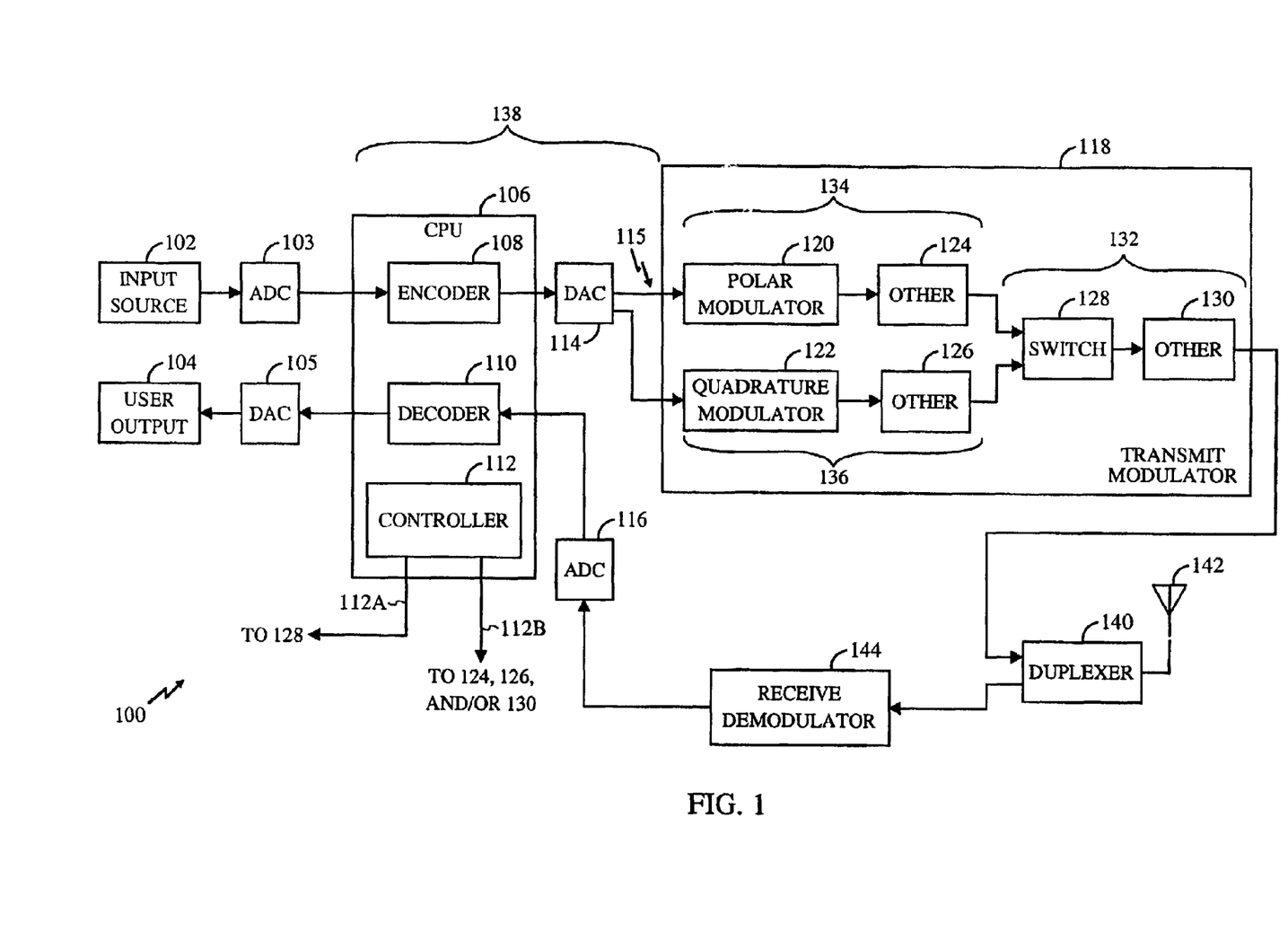
FIG. 1 is an exemplary dual modulation wireless transmitter.

One aspect of this disclosure concerns a communications transmitter, which may be embodied by various hardware components and interconnections, with one example being described by the various transmit components of the transceiver 100 of FIG. 1. The transceiver 100 includes various signal and/or data processing subcomponents, each of which may be implemented by one or more hardware devices, software devices, a portion of one or more hardware or software devices, or a combination of the foregoing. The makeup of these subcomponents is described in greater detail below, with reference to an exemplary digital data processing apparatus, logic circuit, and signal bearing medium.

A central processing unit (CPU) 106 is coupled to an input source 102 via an analog-to-digital converter (ADC) 103, and also coupled to a user output 104 via a digital-to-analog converter (DAC) 105. The CPU 106 is coupled, via a different DAC 114, to a transmit modulator 118. Additionally, the CPU 106 is coupled via a different ADC 116 to a receive demodulator 144. The modulator 118 and demodulator 144 are selectively coupled to an antenna 142 by a duplexer 140.

CPU

As mentioned above, the CPU 106 is coupled to the input source 102 (via ADC 103) and to user output 104 (via DAC 105). The input source 102 may include such components as a microphone, wireless internet connection, modem, or other source of customer, subscriber, or other user data to be encoded, modulated onto a carrier, and transmitted to a remote communications station. The user output 104 comprises a device for presenting information to a human user, and comprises an audio speaker in the illustrated example, although other embodiments may utilize components such as a visual display, modem, and/or other user interface.

The ADC 103 converts analog signals from the input source 102 into digital signals, which are provided to the CPU 106. Conversely, the DAC 105 converts digital signals from the CPU 106 into analog signals for the user output 104. The ADC 103 and DAC 105 may be implemented by known types of circuits. Moreover, in one example, the CPU 106 may be implemented by CPUs such as those utilized in commercially available wireless telephones. More particularly, the CPU 106 may comprise a combination of microprocessor, digital signal processor, and various custom logic components. The CPU 106 includes an encoder 108, decoder 110, and controller 112.

The encoder 108 applies a digital encoding scheme to input signals from the input source 102. In the illustrated example, the input signals comprise voice signals, where the transceiver 100 embodies a wireless mobile communications device. In one embodiment, the encoder 108 utilizes a single encoding technique such as code division multiple access (CDMA), time division multiple access (TDMA), or another technique for transforming raw data into a from suitable for reliable transmission. Optionally, the encoder 108 may comprise multiple encoders to apply different encoding techniques under different circumstances.

The decoder 110 performs the opposite function of the encoder 108. For instance, in the illustrated example the decoder 110 removes CDMA or other encoding from signals from the receive demodulator 144, providing the user output 104 with unencoded voice or other output signals. The decoder 110, like the encoder 108, may employ one predetermined decoding technique or different decoding techniques as appropriate to the type of encoding present on signals from the demodulator 144.

The controller 112 comprises a software, hardware, or other processing subcomponent of the CPU 106, or a separate unit entirely. In one embodiment, the controller 112 includes a transmit power selector that selects the level of transmit power to be used by the modulator 118, and also controls the switch 128 according to the selected transmit power. In this respect, the controller 112 has a link 112a with the switch 128 and a link 112b with components such as 124, 126, 130 (which are discussed in greater detail below). The controller 112 may, for instance, use higher transmit power levels when the unit 100 is communicating with more distant remote stations, or over channels with more ambient noise or interference. Conversely, the controller 112 may dictate lower transmit power levels when the unit 100 is communicating with nearby remote stations, or over channels with less interference. The level of required transmit power may be determined, for example, by evaluating the strength or weakness of received signals, for instance. There are a number of known techniques to implement a suitable transmit power selector, some of which are discussed in U.S. Pat. Nos. 6,069,525, 5,056,109, 6,035,209, 5,893,035, and 5,265,119, the entirety of which are hereby incorporated herein by reference. When implemented as a transmit power selector, the controller 112 is coupled to one or more components 124, 126, 130 (described below) of the transmit modulator 118 in order to implement the selected transmit power.

Alternatively, rather than selecting transmit power, the controller 112 may be implemented as a module to estimate transmit power consumption, or to measure received signal strength. In these embodiments, transmit power selection is performed by another aspect (not shown) of the CPU 106. With these embodiments, the controller 112 regulates the switch 128 according to estimated or measured transmit power or according to received signal strength or transmit power consumption.

As mentioned above, the CPU 106 is coupled to the DAC 114 and ADC 116. These may be implemented by known types of circuits. A signal path 138 includes the CPU 106, DAC 114, and any other components through which signals pass en route from the input source 102 to the transmit modulator 118.

Transmit Modulator

The transmit modulator 118 includes signal paths 134, 136, and 132. Both of the signal paths 134, 136 receive input from the CPU 106 via an output 115 of the DAC 114. The switch 128 couples the signal path 132 to one of the paths 134, 136 in the alternative, in order to form a continuous signal path through the CPU 106 to the duplexer 140 via 138, 134 and 132, or in the alternative, 138, 136 and 132. Each signal path 134, 136 includes a carrier modulator 120, 122 and any optional, other circuitry 124, 126. The modulator 120 comprises circuitry to modulate a carrier, such as a radio frequency (RF) carrier, according the input signal from 115 utilizing the widely known and practiced polar modulation. The modulator 122 comprises circuitry for modulating a carrier, such as an RF carrier, according to the input signal from 115 utilizing the widely known and practiced quadrature modulation technique.

The signal path 132 includes the switch 128 and any optional, additional circuitry 130. By selecting between the path 134 and the path 136, the switch 132 dictates whether the modulator 118 utilizes polar or quadrature type carrier modulation. In one embodiment, the switch 128 comprises a single pole double throw switch, which may be implemented by electrical, electromechanical, mechanical, or software, or other appropriate means. The switch 128 may comprise a high power or low power component, depending upon whether the modulator 118's power amplifiers are implemented in pre-switch components 124, 126 or in the post-switch component 130.

In the illustrated embodiment, the state of the switch is set by the controller 112, which is operably coupled to the switch 128 by 112a. In one embodiment, switch state is controlled according to the transceiver 100's transmit power. Namely, the switch 128 selects polar modulation (the path 134) when the CPU 106 has elected to use high transmit power. Conversely, the switch 128 selects quadrature modulation (the path 136) when the CPU 106 has elected to use low transmit power. Configuration of the switch is set by the controller 112. Instead of selected transmit power, the controller 112 may set the switch according to measured (actual) output power, the type of signal encoding that the CPU 106 uses (e.g., FM, CDMA, etc.), or a combination thereof.

The optional, other circuitry 124, 126, 130 includes components such as drivers, up-converter circuits, power circuits, amplifiers, and other such components as will be familiar to ordinarily skilled artisans familiar with wireless transmitter technology. Components placed at 124, 126 are individual to the polar or quadrature modulation paths 134, 136, whereas any components at the site 130 are located in the common path 132 and therefore applied to signals regardless of whether polar or quadrature modulation is used. Optionally, the circuitry 130 and switch 128 may be changed in position. As another alternative, still further circuitry (not shown) may be added between the circuitry 124, 126 and the switch 128, or other sites as required. Ordinarily skilled artisans will also recognize a variety of other changes that may be made to the placement and configuration of the foregoing components, without departing from the present disclosure.

As mentioned above, the transceiver 100 also includes a receive demodulator 144. The receive demodulator 144 performs a complementary function to the transmit modulator 118. Namely, the demodulator 144 removes carrier modulation from signals arriving on the antenna 142, and provides demodulated receive signals to the CPU 106. The demodulator 144 may be implemented by a number of different well known designs.

The demodulator 144 and modulator 118 are both coupled to the duplexer 140, which is coupled to the antenna 142. The duplexer 140 directs received signals from the antenna 142 to the receive demodulator 144, and in the opposite direction directs transmit signals from the transmit modulator 118 to the antenna 142. The duplexer 140 may be implemented by a number of different well known designs. Among other possible contexts, the duplexer is applicable in CDMA systems, which use different frequencies to transmit and receive. As also contemplated by the present disclosure, a switch (not shown) may be substituted for the duplexer for embodiments utilizing TDMA or other encoding that use the same frequency but different time slots to send and receive data. Depending upon the details of the application, a variety of other components may be used in place of the duplexer or switch, these components nonetheless serving to exchange transmit and receive signals with a common antenna 142. Alternatively, separate antennas may be used for transmitting and receiving, in which case the duplexer 140 may be omitted entirely.

Exemplary Digital Data Processing Apparatus

As mentioned above, data processing entities such as the CPU 106, transmit modulator 118, receive demodulator 144, or any one or more of their subcomponents may be implemented in various forms. One example is a digital data processing apparatus, as exemplified by the hardware components and interconnections of the digital data processing apparatus 200 of FIG. 2.

Figure 2:
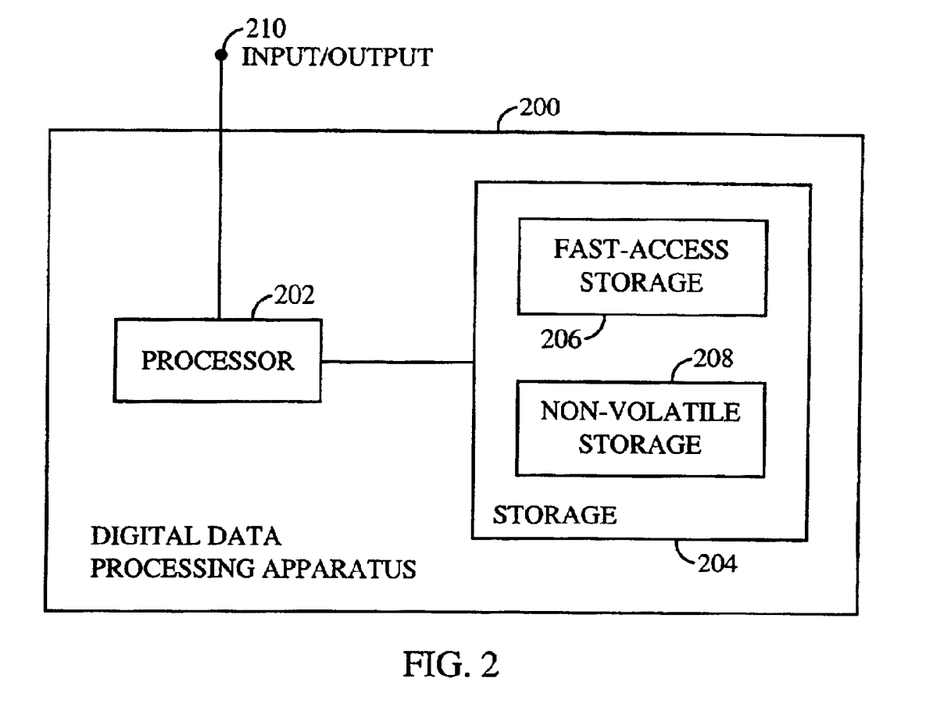
FIG. 2 is an exemplary digital data processing machine.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer executed instructions to implement various processing entities such as those mentioned above. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Operation

Having described the structural features of the present disclosure, the operational aspect of the disclosure will now be described. As mentioned above, the operational aspect generally involves utilizing a transmitter that employs multiple modulation schemes, such as polar carrier modulation and quadrature carrier modulation, under different operational conditions. Although the present invention has broad applicability to transmitters, the specifics of the structure that has been described is particularly suited for a wireless mobile communications station such as a wireless telephone, and the explanation that follows will emphasize such an application of the invention without any intended limitation.

Signal-Bearing Media

Figure 3:
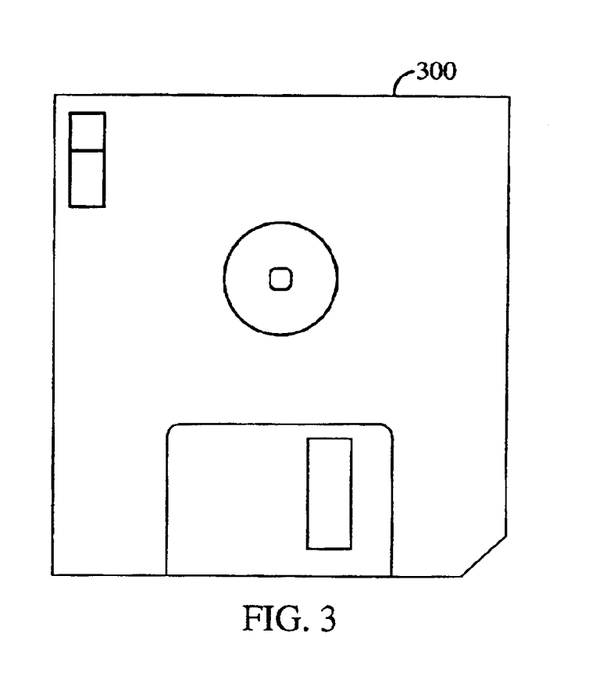
FIG. 3 is an exemplary signal bearing medium.

Wherever the functionality of the invention is implemented using one or more machine-executed program sequences, such sequences may be embodied in various forms of signal-bearing media. Such a signal-bearing media may comprise, for example, the storage 204 (FIG. 2) or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), paper "punch" cards, or other suitable signal bearing media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, some or all of the invention's functionality may be implemented using logic circuitry, instead of using a processor to execute instructions. Such logic circuitry is therefore configured to perform operations to carry out the method aspect of the invention. The logic circuitry may be implemented using many different types of circuitry, as discussed above.

Overall Sequence of Operation

Figure 6:
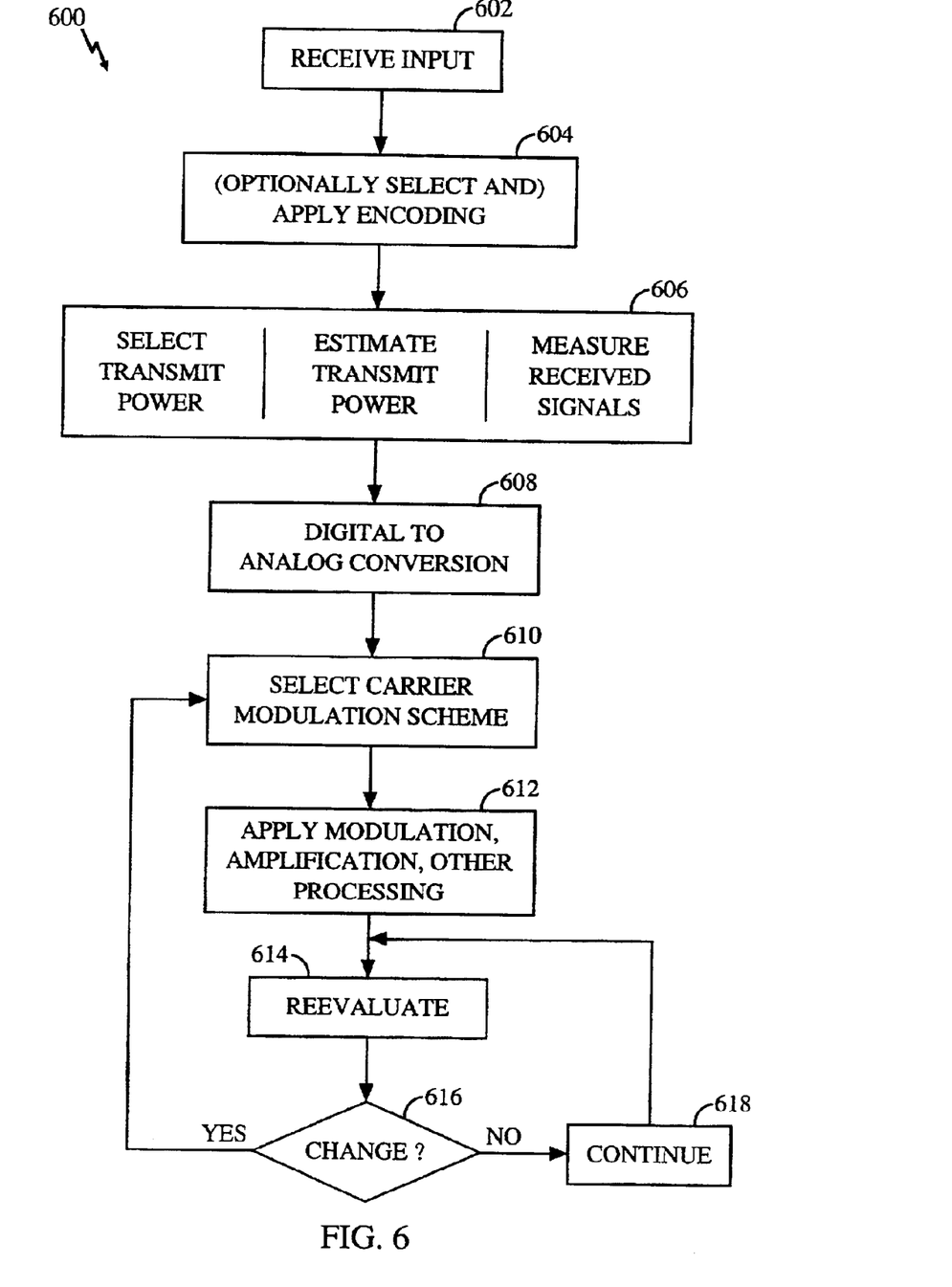
FIG. 6 is a flowchart showing an exemplary operating sequence for a dual modulation wireless mobile transmitter.

FIG. 6 shows a sequence 600 to illustrate one example of the method aspect of the present disclosure. For ease of explanation, but without any intended limitation, the example of FIG. 6 is described in the context of the transceiver 100 described above. In this context, the sequence 600 illustrates the operation of the transceiver 100 related to signal transmission.

In step 602, the CPU 106 receives an input signal from the input source 102 via the ADC 103. In the presently illustrated example, the input source 102 comprises a microphone and the input signal comprises a signal representing audio signals output by this microphone. This input signal is digitized by the ADC 103. Thus, in step 602, the CPU 106 receives digital signals representing analog sounds sensed by the microphone/input source 102.

In step 604, the encoder 108 encodes the input signal from the input source 102 with a predetermined type of signal encoding. Optionally, if the encoder 108 includes facilities for multiple encoding schemes, step 604 also involves the CPU 106 selecting the type of encoding to be used. For instance, CDMA encoding may be used when the transceiver user is in an area serviced by a CDMA network, whereas FM encoding may be used when a CDMA network is not available but an FM network is available.

In step 606, the controller 112 outputs information by which the switch 128 can determine its own operating state. Alternatively, the controller 112 itself may use this information to identify the proper setting for the switch, and directly configure the switch accordingly. In either case, certain information is used to determine switch state. In one embodiment, the controller 112 selects the level of transmit power to be used in the transmit modulator 118. In this embodiment, to initiate transmitting at the selected transmit power level, the controller 112 provides representative instructions to the power circuits, drivers, or other components implemented in the transmit modulator 118 at 124, 126, and/or 130. The controller 112 also advises the switch 128 of the selected transmit power; alternatively, the controller 12 may directly control the switch 128, in which case it sets the state of the switch according to the selected transmit power.

In a different example, the controller 112 in step 606 estimates the level of transmit power being used by the modulator 118, independent of the different component (not shown) that actually selects transmit power. The controller 112 outputs this information to the switch 128, or directly controls the state of the switch based on this information. Transmit power may be estimated, for example, by a diode detector at the output of a power amplifier in the transmit modulator 118.

In still another example, the controller 112 in step 606 measures the strength of signals received from the remote station with which it is presently communicating (i.e., transmitting and receiving). The controller 112 outputs this information to the switch 128, or as an alternative, directly sets the state of the switch 128 based upon this information. The strength of received signals may be measured, for example, by received signal strength indicator (RSSI) circuitry in the transceiver's receiver (not shown). As a more particular example, received signal strength may be measured as taught by U.S. Pat. No. 5,903,554, the entirety of which is hereby incorporated by reference.

Although step 606 is shown in a particular order relative to other steps 604, 608, step 606 may be performed at any other time prior to step 610 (at which time the output of step 606 is required to operate the switch 128, as discussed below). After step 606 (as illustrated), the DAC 114 converts the encoder 108's output into an analog signal, and provides this analog signal to the transmit modulator 118 (step 610).

In step 610, the transmit modulator 118 selects the type of carrier modulation to be used, which in the present example comprises polar or quadrature modulation. More particularly, the switch 128 acts according to the information provided by the controller 112 in step 606. For instance, if the controller 112 in step 606 indicated a high level of selected transmit power, or a high level of estimated transmit power, or a low received signal strength, then the switch 128 couples its path 132 to the path 134 in order to utilize polar modulation. If the opposite circumstances arise, the switch 128 couples its path 132 to the path 136 in order to utilize quadrature modulation. Alternatively, rather than the switch 128 acting upon such information from the controller 112 to decide which path 134, 136 to use, the controller 112 may perform this decision itself, in which case step 610 involves the controller 112 directly setting the state of the switch 128 to one of the paths 134, 136.

In one example, the switch 128 may utilize a prescribed threshold of selected transmit power, estimated transmit power, received signal strength, or other condition. Above the threshold, the switch 128 selects the one of the paths 134, 136, and below the threshold the other path 134, 136, as appropriate. Alternatively, this decision may be made by the controller 112, in which case, the controller 112 directly instructs the switch 128 to connect to a particular one of the paths 134, 136.

Figure 4:
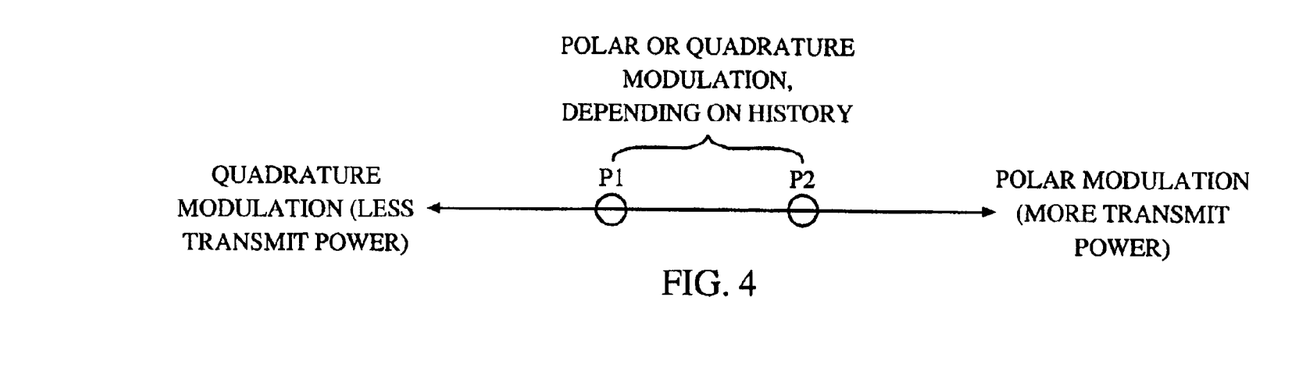
FIG. 4 is a graph of quadrature versus polar carrier modulation modes depending upon transmit power.
Figure 5:
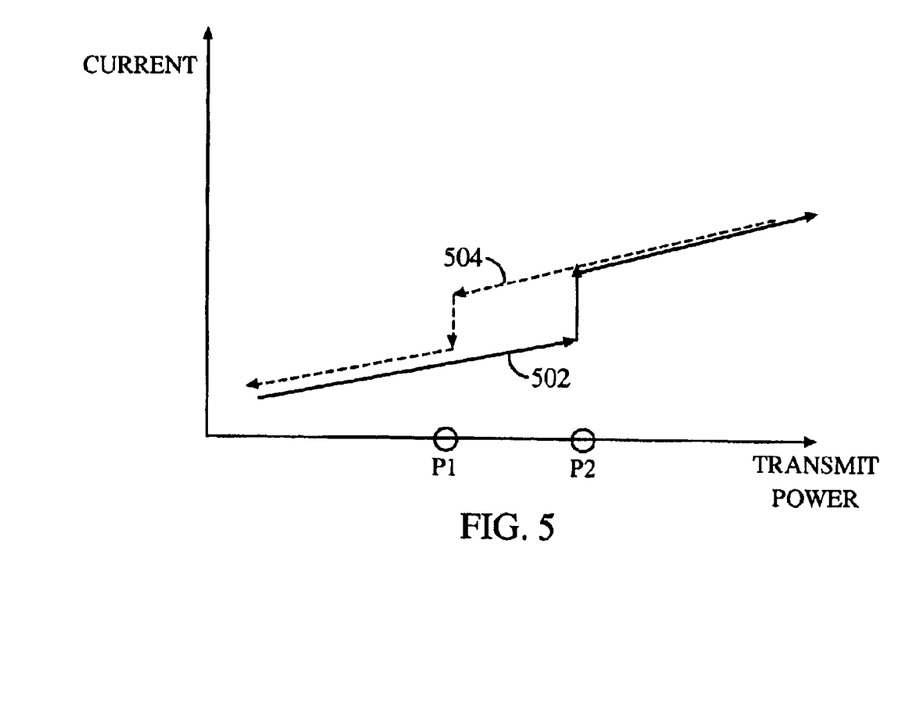
FIG. 5 is a graph of transmit power versus current consumption, and also showing quadrature and polar carrier modulation modes.

A different embodiment is also contemplated for selecting the state of the switch 128 to avoid "thrashing" between polar and quadrature modulation under borderline conditions. Namely, first and second prescribed thresholds are used as discussed below. This approach is shown by FIG. 4, with transmit power being used as the exemplary condition for determining state of the switch 128. Below the first threshold (P1), quadrature modulation is always used. Above the second threshold (P2), polar modulation is always used. Even after transmit power starts to increase past the first threshold, however, quadrature modulation is still used between the thresholds, until the second threshold is reached. Likewise, polar modulation is still used as transmit power dips below the second threshold, but only as long as transmit power does not decrease beneath the first threshold. This approach is also illustrated by FIG. 5, where transmit power is shown against current consumed by the CPU 106 and transmit modulator 118. In FIG. 5, polar modulation is used in the regime 504 and quadrature modulation used in the regime 502.

In still another embodiment, switch state may be changed according to the type of encoding being applied by the encoder 108, rather than transmit power or received signal strength. As a further example, a combination of signal encoding and estimated or selected transmit power (or received signal strength) may be used. For instance, the switch 128 may select polar modulation whenever the encoder 108 utilizes FM encoding, and also whenever the encoder 108 utilizes CDMA as long as transmit power exceeds a prescribed threshold (or receive signal strength does not exceed the threshold). In this example, the switch 128 only selects quadrature modulation when the encoder 108 utilizes CDMA and transmit power does not exceed the prescribed threshold (or received signal strength exceeds the given threshold). Furthermore, this approach may be modified by using dual thresholds to prevent thrashing, as discussed above in conjunction with FIGS. 4–5.

Having configured the switch 128 as desired (step 610), various components of the signal path formed by the current configuration of the switch 128 perform their assigned functions (step 612). Namely, in the signal path 134 or 136 selected by the switch 128, the applicable modulator 120 or 122 modulates its carrier, and the other circuitry 124, 126 performs the function of its drivers, amplifiers, or other applicable circuitry. Also in step 612, the other circuitry 130 carries out the function of its drivers, amplifiers, and the like.

In step 614, the controller 112 reevaluates the current configuration of the switch 128, or alternatively, the switch 128 reevaluates its own configuration based upon the output of the controller 112. This is done to determine whether present circumstances dictate using polar or quadrature modulation. In step 616, the switch 128 or controller 112 determines whether any change is warranted. For instance, this may involve the switch 128 determining whether the output of the controller 112 has changed, the controller 112 determining whether the CPU's encoding scheme has changed, the controller 112 determining whether the current transmit power or receive signal strength has changed, etc. If circumstances have not changed, step 616 advances to step 618, where the switch 128 continues operating in its current state. Otherwise, if step 616 detects the need to change switch configuration, control returns to step 610 which is performed in the manner discussed above.

Other Embodiments

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

Moreover, the previous description is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The word "exemplary" is used herein to mean "serving as an example, instance, or illustration." Any embodiment described herein as "exemplary" is not necessarily to be construed as preferred or advantageous over other embodiments.

What is claimed is:

1. A dual modulation transmitter apparatus, comprising:
    a first signal path including a polar carrier modulator coupled to a data input;
    a second signal path including a quadrature carrier modulator coupled to the data input;
    a third signal path coupled to an antenna and including a switch configured to couple the third signal path to the first signal path under a first condition and alternatively to couple the third signal path to the second signal path under a second condition.

2. The apparatus of claim 1, further comprising a controller coupled to the switch, where the controller is configured to set the switch to couple the third signal path to the first signal path under the first condition and to set the switch to couple the third signal path to the second signal path under the second condition.

3. The apparatus of claim 1, where the switch is configured such that the first condition comprises transmit power level satisfying predetermined criteria, and the second condition comprises transmit power level not satisfying the predetermined criteria.

4. The apparatus of claim 3, where transmit power comprises one of the following:
    measured transmit power of the antenna;
    a level of transmit power selected by a transmit power selector module for use in transmitting signals via the antenna.

5. The apparatus of claim 3, the predetermined criteria comprising transmit power exceeding a prescribed threshold.

6. The apparatus of claim 3, the predetermined criteria comprising transmit power exceeding a prescribed first threshold, the predetermined criteria additionally being satisfied by the transmit power decreasing from levels greater than the first threshold to levels less than the first threshold but still exceeding a prescribed second threshold.

7. The apparatus of claim 1, where the switch is configured such that the first condition comprises the antenna receiving designated signals having signal strength satisfying a predetermined criteria, and the second condition comprises the designated signals having signal strength that does not satisfy the predetermined criteria.

8. The apparatus of claim 7, the predetermined criteria comprising signal strength being less than a first prescribed threshold, the predetermined criteria additionally being satisfied by the signal strength increasing from levels less than the first threshold to levels greater than the first threshold but still not exceeding a prescribed second threshold.

9. The apparatus of claim 1, where the data input comprises output of a fourth signal path including a digital signal encoder, and the switch is configured such that the first and second conditions comprise different encoding schemes being used by the encoder.

10. The apparatus of claim 1, where:
    the data input comprises output of a fourth signal path including a digital signal encoder;

the switch is configured such that the first condition comprises any one of the following (a) the encoder using a frequency modulation (FM) scheme, or (b) the encoder utilizing a code division multiple access (CDMA) encoding scheme and transmit power level satisfying a predetermined criteria;

the switch is configured such that the second condition comprises the encoder utilizing the CDMA encoding scheme and transmit power level not satisfying the predetermined criteria.

11. A dual modulation transmitter apparatus configured to transmit at various power levels responsive to various conditions, comprising:

a first signal path including a polar carrier modulator coupled to a data input;

a second signal path including a quadrature carrier modulator coupled to the data input;

a third signal path coupled to an antenna and including a switch configured to couple the third signal path to the first signal path responsive to conditions for which the transmitter apparatus is configured to transmit at power levels that satisfy predetermined criteria and to couple the third signal path to the second signal path responsive to conditions for which the transmitter apparatus is configured to transmit at power levels that do not satisfy the predetermined criteria.

12. A dual modulation transmitter apparatus, comprising:

a first signal path including means for polar carrier modulation of signals arriving at a data input;

a second signal path including means for quadrature carrier modulation of signals arriving at the data input;

a third signal path coupled to an antenna and including switching means for coupling the third signal path to the first signal path under a first condition and alternatively coupling the third signal path to the second signal path under a second condition.

13. A method for operating a transmitter to perform dual mode modulation of a carrier with a data signal, comprising operations of:

if a first condition exists, modulating the carrier with a data signal by applying polar modulation;

alternatively, in the absence of the first condition, modulating the carrier with a data signal by applying quadrature modulation.

14. The method of claim 13, where the first condition comprises transmit power level satisfying predetermined criteria, and the second condition comprises transmit power level not satisfying the predetermined criteria.

15. The method of claim 14, where transmit power comprises one of the following:

measured transmit power of the antenna;

a level of transmit power selected by a transmit power selector module for use in transmitting signals via the antenna.

16. The method of claim 13, the predetermined criteria comprising transmit power exceeding a prescribed threshold.

17. The method of claim 13, the predetermined criteria comprising transmit power exceeding a prescribed first threshold, the predetermined criteria additionally being satisfied by transmit power decreasing from levels greater than the first threshold to levels less than the first threshold but still exceeding a prescribed second threshold.

18. The method of claim 13, where the transmitter and a receiver are exchanging signals with a remote station, and the first condition comprises the receiver receiving designated signals having signal strength satisfying predetermined criteria, and the second condition comprises the designated signals having signal strength that does not satisfy the predetermined criteria.

19. The apparatus of claim 18, the predetermined criteria comprising signal strength being less than a prescribed first threshold, the first criteria additionally being satisfied by the signal strength increasing from levels less than the first threshold to levels that are greater than the first threshold but still do not exceed a prescribed second threshold.

20. The method of claim 13, where the first condition comprises the data signal having a first encoding type and the second condition comprises the data signal having a second encoding type.

21. The method of claim 13, where:

the first condition comprises any one of the following (a) the data signal being encoded with a frequency modulation (FM) scheme, or (b) the data signal being encoded with a code division multiple access (CDMA) encoding scheme and transmit power level satisfying a predetermined criteria;

the second condition comprises the encoder utilizing the CDMA encoding scheme and transmit power level not satisfying the predetermined criteria.

* * * * *